MAGNETIC TAPE READING SYSTEM

Filed March 18, 1957 2 Sheets-Sheet 1

INVENTOR.
GEORGE J. GIEL
BY Byard G. Nilsson
ATTORNEY

Aug. 1, 1961

G. J. GIEL 2,994,857

MAGNETIC TAPE READING SYSTEM

Filed March 18, 1957

2 Sheets-Sheet 2

INVENTOR.
GEORGE J. GIEL
BY Byard G. Nilsson
ATTORNEY

United States Patent Office 2,994,857
Patented Aug. 1, 1961

2,994,857

MAGNETIC TAPE READING SYSTEM

George J. Giel, Redondo Beach, Calif., assignor to The Bendix Corporation, a corporation of Delaware Filed Mar. 18, 1957, Ser. No. 646,706
3 Claims. (Cl. 340—174.1)

This invention relates to magnetic record reading systems and more particularly to systems wherein information signals may be read from a magnetic medium at a reduced rate.

Signals may be recorded on a magnetic medium, e.g. tape, by varying the magnetization of the medium in accordance with a signal to be recorded. These signals are normally read from a magnetic medium as tape by moving the tape relative to a magnetic reading head so that an electrical signal is induced in the reading head which varies as the change in magnetic flux emanating from the tape. In accordance with one common method of reading signals from a magnetic tape, the tape is rapidly drawn over magnetic heads by a reeling apparatus. In such a system the tape must ordinarily travel above a certain speed, or changes in magnetic field along the tape will not occur at a rate rapid enough to induce a voltage in the heads which is adequate to form a usable signal. Therefore, because the tape must travel at a speed above a predetermined rate, a problem exists in attempting to read signals from a magnetic tape at low rates. One method of reducing the rate at which information signals are read from a tape is to space such signals further apart upon the tape; however, such low density recording is accompanied by poor utilization of the magnetic tape.

According to the present invention, in its more general form, magnetic reading heads are moved to repeatedly scan a stationary magnetic medium as tape. The invention then incorporates a control system which utilizes a single channel of the magnetic medium for selecting the information signals to be read during each scanning of the tape and for checking off signals which have been read. The control system further includes means for advancing the magnetic medium each time all the signals within a certain area have been read.

An object of this invention is to provide an improved system for reading information signals from a magnetic medium.

Another object of this invention is to provide a magnetic-tape-readying system for reading signals at a reduced rate from a tape having a high recorded-information density.

Still another object of this invention is to provide a system for reading magnetic tape wherein only a small portion of the magnetic tape is required for control signals.

A further object of this invention is to provide an improved magnetic tape reader to read magnetic tapes at a rate substantially reduced from the rate at which such tapes are recorded.

Other and incidental objects and advantages of this invention will be apparent to those skilled in the art from reading the following specification and on inspection of the accompanying drawings in which.

Figure 1:
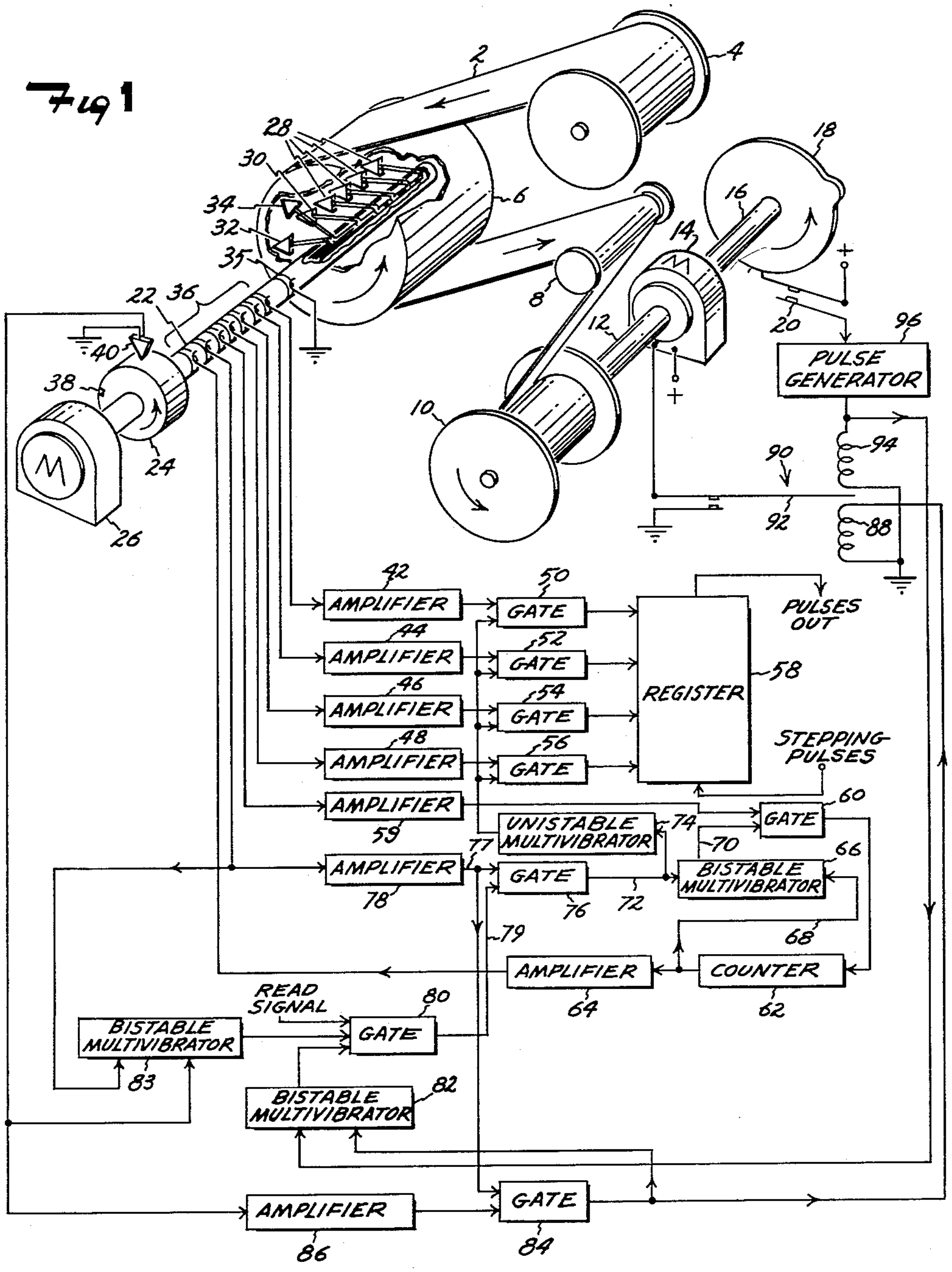
FIGURE 1 is a perspective and diagrammatic representation of a system constructed in accordance with the present invention.

Referring now to the drawings, and particularly to FIGURE 1, there is shown a magnetic tape 2 mounted such as to be drawn from a reel 4 over a drum 6, a rider 8, and rewound upon a reel 10. The tape 2 is motivated by movement of the reel 10 which is in turn intermittently driven through a shaft 12, by a motor 14. The motor 14 is also connected to a shaft 16 which carries a cam 18 for controlling the state of a pair of contacts 20.

The drum 6 is supported upon a shaft 22 which also carries a cylinder 24. The shaft 22 is connected to be continually driven in a counter clockwise direction by a motor 26 when the system is in operation. The drum 6 carries magnetic sensing or reading heads 28 for sensing four digital information channels. These heads 28 are mounted within the drum and in alignment with the axis of the drum 6. The heads 28 are positioned so as to have their sensing surface coincide with the arcuate surface of the drum 6. A reading head 30 is mounted in axial alignment with the row of heads 28, and serves to sense a clock channel of the magnetic tape 2. Angularly offset from the head 30 in the drum are heads 32 and 34. These heads 32 and 34 are also angularly disposed with respect to the other heads in the drum 6 and each other, both are mounted to operate in one channel of the tape 2. The magnetic head 32 is a read or sensing head, and the magnetic head 35 is a write or recording head. Each of the heads in the drum 6 have two connecting wires. One wire from each head is connected to ground through a single slip ring 35 in the shaft 22. The other wires from the heads are brought into the shaft 22 and individually connected to slip rings 36.

The cylinder 24 is formed to include a bar magnet 38. A magnetic reading head 40 is then positioned adjacent the arcuate surface of the cylinder 24 so that an electrical pulse is induced in the head 40 upon each revolution of the cylinder 24, as the magnet 38 passes under the head 40. The magnet 38 is angularly positioned to coincide with the angular position of the last recorded digital signal on the tape 2, toward the reel 4, which is to be read by the head 32 prior to advancing the tape. That is, the magnet 38 is so placed in the cylinder 24, that a pulse will be formed in the head 40 at a time when the head 32 is sensing signals from the tape 2 which are recorded on the tape 2 at a point barely removed from the point where the tape 2 departs from the drum 6 to be connected to the reel 4.

The information-signal-sensing heads 28 are connected through the slip rings 36 to amplifiers 42, 44, 46, and 48 respectively. These amplifiers amplify the received signals and apply such signals to gate circuits 50, 52, 54, and 56 respectively. The gate circuits are coincidence gates which function to provide a two-state signal at a high value when both input signals are high, but to otherwise provide a low value.

The outputs from these gate circuits are connected to a digital register 58. The register 58 is a four stage binary counter capable of being set by four parallel signals, and of shifting registered signals out in a serial fashion. One such register is shown and described in U.S. Patent 2,735,-005, issued February 14, 1956, to F. G. Steele. Other registers or external circuits may be employed to receive the information read from the tape 2; however the register 58 provides a serial output occurring at a rate controlled by a utilization system.

The read head 30, which is associated with the clock channel of the tape 2, is connected to ground and to an amplifier 59 by means of the slip rings of the shaft 22. The amplifier 59 is connected to one of the inputs of a gate circuit 60, which is similar to the gate circuit 50 and all the other gates of the system. The output from this gate circuit 60 is connected to a counter 62. The counter 62 may take various forms and serves to form a pulse after having received a predetermined number of input pulses, e.g. thirty pulses in one embodiment. The counter 62 may, for example, be a multi-stage binary counter of the type mentioned above. The output from the counter 62 is connected through an amplifier 64 and one of the slip rings 36 to the write head 34.

The output of the counter 62 is also connected to set the state of a bistable multivibrator 66. When the multivibrator 66 receives a signal from the counter 62 on a line 68, the state of the multivibrator becomes such that a low value of a two-state signal appears in a line 70 to inhibit the gate 60 i.e. prevent its output from being high. If the multivibrator 66 receives a high signal or pulse on a line 72, then the state of the multivibrator will be such that a high value of the two-state signal will appear on the output line 70, thereby qualifying the gate circuit 60, i.e. enabling its output to be high. The input to the multivibrator 66 on the line 72 also passes through a monostable multivibrator 74 to control the gate circuits 50, 52, 54, and 56. This signal in the line 72 contains a pulse when a gate circuit 76 is set high by the occurrence of high two-state signals upon both of its input lines 77 and 79. The input line 77 to the gate circuit 76 is connected to receive pulses from the read head 32 via one of the slip rings 36 and an amplifier 78. The other line 79 to the gate circuit 76 is connected to receive a two-state signal from a gate circuit 80. The gate circuit 80 receives one two-state signal which may be termed a "read signal" and which is high whenever information is to be read from the system. This signal may be generated by the apparatus receiving the information signals from the tape, e.g. a computer, or may constitute simply a manual switch for providing a high signal when operation is to occur. The other signal inputs to the gate circuit 80 are received from bistable multivibrators 82 and 83 the control of which is described below.

In the operation of the system, the heads in the drum 6 act to sequentially read one row of information signals recorded upon the tape 2 during each revolution of the drum 6. After substantially all the information has been read from the section of tape 2 which is carried contiguous to the drum 6, the tape 2 is advanced to place a new area of tape over the drum 6. The time when such an advance must be made is sensed by a gate circuit 84. The gate circuit 84 receives one pulse from the head 32 via the amplifier 78, and another pulse from the head 40 via an amplifier 86. The output from the gate circuit 84 is connected to the bistable multivibrator 82 to place this circuit in a state wherein the output signal is low and the gate circuit 80 is disqualified; thereby halting information reading during a tape advance operation. The output of the gate circuit 84 is also connected through a coil 88 of a relay 90 to ground. The relay 90 has two stable states. The energization of the coil 88 moves a movable contact 92 of the relay 90 to a position to connect the movable contact to ground and thereby energize the tape-advance motor 14.

The relay 90 also includes a coil 94, energization of which serves to disconnect the movable contact 90 from ground. The coil 94 is energized when the cam 18 closes contacts 20 to thereby pass a voltage to a pulse generator 96 the output of which is connected through the coil 94 to ground. The output of the pulse generator 96 is also connected to the bistable multivibrator 82 in such a manner as to place this circuit in a state wherein a high signal will be applied to the gate circuit 80, to thereby indicate that the tape 2 is not undergoing an advancement and that information may be read from the tape. After a row of information, i.e. one digit from each information channel, has been read and gated to the register 58, it is necessary to disable the gate circuits 50, 52, 54, and 56 during the remainder of the revolution of the drum 6. This disabling is necessary to prevent double reading of signals on the tape 2. To perform this function, the bistable multivibrator 83 disables the gate circuit 80 to thereby disable the gate circuit 76 which in turn disables the gate circuits 50, 52, 54, and 56. The multivibrator 83 is placed in a state to qualify the gate circuit 80 by a pulse from the head 40. The other state of the multivibrator is effected by the pulse from the head 32.

Figure 2:
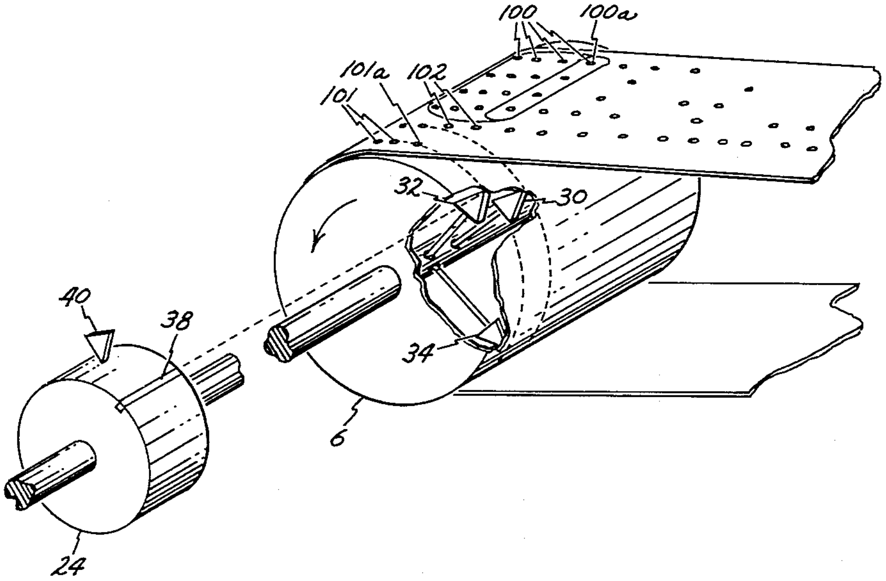
FIGURE 2 is a diagrammatic representation illustrating the mode of operation of a portion of the system of FIGURE 1.

To consider the operation of the system of FIGURE 1, reference will be made simultaneously to FIGURES 1 and 2. FIGURE 2 shows a diagrammatic representation of a portion of the system of FIGURE 1, and additionally shows representations of digital magnetic signals recorded upon the tape 2. In general the operation of the system is to sequentially read rows 100 of information signals as shown in FIGURE 2 which are disposed transversely across the tape. One such row is read during each revolution of the drum 6. After a row has been read it is "checked off" by having a control signal 101 recorded at its side. After the tape 2 contiguous to the drum 6 has been read, this condition is sensed, the reading is stopped, and the tape is advanced to place a new section of tape over the drum 6 to be read. It may therefore be seen that by varying the physical factors involved, magnetic tape can be read by systems embodying the present invention, at greatly reduced rates.

Assuming that the tape 2 is in a position as shown in FIGURE 2, with the drum 6 revolving in a counter clockwise direction, as the head 32 senses the magnetized area 101*a*, which constitutes a control signal, an electrical pulse is applied to the amplifier 78. This pulse is amplified and applied to input line 77 of the gate circuit 76. Providing that the tape is not being advanced, and that the system into which information is being read is conditioned to receive information, the gate circuit 80 is qualified, and another input line 79 to the gate circuit 76 provides a high signal, thus enabling the pulse from the amplifier 78 to pass to the unistable multivibrator 74, and the bistable multivibrator 66. The unistable multivibrator 74 forms a brief pulse at the input to each of the gate circuits 50, 52, 54, and 56 thereby qualifying each of these gataes and allowing the information signals 100*a* (as shown on the tape 2) which are read by the heads 28 and amplified by the amplifiers 42, 44, 46, and 48 respectively, to pass the gate circuits and enter the register 58. The register 58 may actually constitute the device into which information is read; however, as shown in FIGURE 1, an arrangement is provided wherein stepping pulses, from the device into which information is read, occur at the rate indicating the demand for information signals, and these pulses step the information signals out of the register 58 in a serial fashion.

The pulse from the head 32 is also applied to the bistable multivibrator 83 and changes the state of that circuit to provide its two-state output at a low value. This change disables the gate 80 and prevents further information signals from passing to the register 58 during this revolution of the drum 6. As the heads of the drum 6 begin scanning the tape during the next revolution, a pulse is formed by the magnet 38 passing under the head 40. This pulse is applied to the multivibrator 83 to again ready the system for reading information signals.

The pulse from the gate circuit 76 in addition to triggering the unistable multivibrator 74 also changes the state of the bistable multivibrator 66 to cause this circuit to provide a high signal to the gate circuit 60. The gate circuit 60 is thus qualified, and clock pulses 102 sensed by the head 30 and amplified by the amplifier 58 are passed through the gate circuit 60 to step the counter 62. The counter 62 serves to provide a delay period between the time when the head 32 senses a pulse, and the time when the head 34 has moved into a position in line with the row of information signals read, to record a control signal indicating the row has been read. The necessary delay results from the inability of magnetic heads to be so placed as to operate upon adjacent rows of information due to their physical size.

The counter 62 therefore counts while the head 34 moves closer to the row of information signals 101*a*. When the head 34 is positioned precisely at the side of the row of signals 101*a*, the counter will have counted to its capacity, and a pulse will be formed at its output. The output pulse from the counter 62 is amplified by the amplifier 64 and applied to the head 34 through one of the slip rings 36. As a result a pulse is recorded in the control-signal channel of the tape 2 adjacent to the row of information signals 101*a*, just read. During the next cycle of the drum 6, this signal will be sensed by the head 32 to indicate that the following row of signals 100 scanned by heads 28 are to be read.

The output pulse from the counter 62 also is applied to the bistable multivibrator 66 to place this circuit in a state wherein its two-state output will be at a low value, to thereby disqualify the gate circuit 60. This disqualification of the gate circuit 60 prevents clock pulses from the amplifier 58 from passing to the counter 62, until the operation described above is repeated.

As the above-described operation proceeds, the row of information signals being read continually moves closer to the reel 4. The magnet 38 in the cylinder 24 is so positioned as to induce a voltage in the head 40 at a time when the information heads 28 are positioned to read the last information signals to be read prior to an advance of the tape 6. During operation prior to a tape advance the pulses from the head 40 pass through the amplifier 86 and are then stopped at the gate 84 because the pulse from the head 32 has not yet occurred. However, when nearly all the tape surrounding the drum 6 has been read, a time will occur when the pulse from the head 40 occurs in coincidence with the pulse from the head 32. The occurrence of this event indicates that the time has arrived for the tape 2 to be advanced. This event enables the gate circuit 84 to pass a pulse which is applied to the bistable multivibrator 82. The pulse from the gate circuit 84 places the multivibrator 82 in a state such that its two-state output voltage is at a low value thereby inhibiting the gate circuit 80. With the gate circuit 80 inhibited, the gate circuit 76 will also be inhibited and the control pulses from the head 32 will not be passed to command a reading. As a result the further reading of information will be halted.

The pulse from the gate circuit 84 is also applied to the coil 88, thereby energizing the coil and moving the movable contact 92 to ground. Placing the movable contact 92 at ground potential energizes the motor 14. The motor therefore turns to advance the tape 2 over the drum 6. It is to be noted that various systems and devices may be used for advancing the tape various amounts, e.g. depending upon the amount of tape accumulated upon the reel 4 etc.; however, such arrangements will be apparent to those skilled in the art.

After the tape has been advanced one revolution by the motor 14, the cam 18 is so driven by the motor 14 to close the contacts 20 thereby applying a voltage to pulse generator 96, the output of which energizes the coil 94 to remove the contact 92 from ground potential and de-energize the motor 14. The output from the pulse generator 96 is also connected to the bistable multivibrator 82, and serves to reset the state of this circuit to provide a high two-state output voltage from the multivibrator which will qualify the gate circuit 80 and enable reading of the tape to proceed.

It may therefore be seen that this invention provides an improved magnetic tape reading system wherein only a single channel of the tape is required to check off the information which has been read. Further, the system may be designed to read magnetic tape at a variety of speeds. The system additionally functions to progressively advance new sections of tape over the drum 6 as each such section is completed.

Although for the purpose of explaining the invention, particular embodiments thereof have been shown and described, obvious modifications will occur to a person skilled in the art and this invention is not to be limited to the details of the described embodiment.

What is claimed is:

1. A magnetic tape transducing system comprising: a plurality of information signal sensing magnetic heads; a control signal sensing magnetic head; a control signal recording magnetic head; a drum adapted to carry a section of magnetic tape and having said magnetic heads mounted therein so that said control signal sensing magnetic head and said control signal recording magnetic head are offset to scan one channel of said tape and said information signal sensing magnetic heads scan other channels of said tape; means for revolving said drum; gating means connected to gate signals from said information signal sensing magnetic heads under control of signals from said control signal sensing magnetic head; means for applying a signal to said control signal recording magnetic head to produce an indication in said one channel to indicate that the contents of a certain portion of said tape has been gated by said gating means; and means for advancing said tape to provide a new section of tape over said drum when said indications in said one channel progress to a predetermined location on said magnetic tape.

2. A magnetic tape reading system comprising: a plurality of information signal sensing magnetic heads; a control signal sensing magnetic head; a control signal recording magnetic head; a drum adapted to carry a section of a magnetic tape and having said magnetic heads mounted therein so that said control signal sensing magnetic head and said control signal recording magnetic head are offset to operate in one channel of said tape and said information signal sensing magnetic heads operate in other channels of said tape; means for revolving said drum; gating means connected to gate signals from said information signal sensing magnetic heads under control of signals from said control signal sensing magnetic head; means for applying a signal to said control signal recording magnetic heads to cause an indication in said one channel to indicate that the contents of a certain portion of said tape has been gated; a pulse generator for generating a pulse each revolution of said drum as said drum passes through a predetermined position; coincidence means for detecting a coincidence between a pulse from said pulse generator and a signal from said signal sensing magnetic head to thereby indicate the necessity for an advance in said magnetic tape; and tape advance means connected to said coincidence means for advancing said tape under control of said coincidence means.

3. Apparatus according to claim 2 wherein said pulse generator comprises: a disk mechanically connected to be driven with said drum, said disk including a magnetic variation in one portion of its arcuate surface, and means for sensing said variation.

References Cited in the file of this patent

UNITED STATES PATENTS

| | | |
|---|---|---|
| 2,614,169 | Cohen et al. | Oct. 14, 1952 |
| 2,648,589 | Hickman | Aug. 11, 1953 |
| 2,722,676 | Begun | Nov. 1, 1955 |
| 2,755,422 | Livingston | July 17, 1956 |
| 2,817,072 | Chien et al. | Dec. 17, 1957 |